(12) United States Patent
Lukic et al.

(10) Patent No.: US 8,986,158 B2
(45) Date of Patent: Mar. 24, 2015

(54) REDUCTION GEARING WITH A HIGH REDUCTION RATIO

(71) Applicant: Maxon Motor AG, Sachsein (CH)

(72) Inventors: Darko Lukic, Freiburg (DE);
Karl-Heinz Gieb, Freiburg (DE)

(73) Assignee: Maxon Motor AG, Sachsein (CH)

( * ) Notice: Subject to any disclaimer, the term of this patent is extended or adjusted under 35 U.S.C. 154(b) by 0 days.

(21) Appl. No.: 14/089,120

(22) Filed: Nov. 25, 2013

(65) Prior Publication Data

US 2014/0148302 A1 May 29, 2014

(51) Int. Cl.
*F16H 1/28* (2006.01)
*F16H 35/02* (2006.01)
*F16H 1/32* (2006.01)
*F16H 57/08* (2006.01)

(52) U.S. Cl.
CPC ............... *F16H 1/28* (2013.01); *F16H 35/02* (2013.01); *F16H 1/32* (2013.01); *F16H 1/2836* (2013.01); *F16H 57/082* (2013.01)
USPC .......................................... 475/331; 475/346

(58) Field of Classification Search
USPC .......................................................... 475/346
See application file for complete search history.

(56) References Cited

U.S. PATENT DOCUMENTS

| 3,602,070 | A | * | 8/1971 | Verge et al. | 475/177 |
| 3,792,629 | A | * | 2/1974 | Applebury | 475/342 |
| 4,713,985 | A | * | 12/1987 | Ando | 475/168 |
| 5,879,081 | A | * | 3/1999 | Chordia | 366/249 |
| 7,678,007 | B2 | * | 3/2010 | Horie et al. | 475/180 |

FOREIGN PATENT DOCUMENTS

| DE | 10261669 A1 | 8/2004 |
| DE | 102009006044 A1 | 8/2010 |
| WO | 02090149 A1 | 11/2002 |

OTHER PUBLICATIONS

EP12007974.4, European Search Report, dated May 24, 2013, 6 pgs.

* cited by examiner

*Primary Examiner* — Derek D Knight
*Assistant Examiner* — David Morris
(74) *Attorney, Agent, or Firm* — Dickinson Wright PLLC

(57) ABSTRACT

The present invention relates to a reduction gearing with a ring gear, at least one planet gear rolling around in the ring gear and having a planet gear axis, and an output being rotatably mounted coaxially to the ring gear. According to the invention, it is provided that the planet gear comprises a guide member that is spaced apart from the planet gear axis and describes a hypocycloid relative to the ring gear when the planet gear rolls around, wherein guidance is provided between the guide member and a cam disk of the output, such that the output experiences a drive motion by the planet gear rolling around.

14 Claims, 10 Drawing Sheets

REDUCTION GEARING WITH A HIGH REDUCTION RATIO

This application claims benefit of the filing date of EP12007974.4, filed Nov. 27, 2012, the entire contents of which is incorporated herein by reference for all purposes.

BACKGROUND

1. Field

The present invention relates to a reduction gearing with a high reduction ratio according to the preamble of independent claim 1. Such a gearing comprises a ring gear, at least one planet gear rolling around in the ring gear having a planet gear axis, and an output being rotatably mounted coaxially to the ring gear.

2. Description of Related Art

A reduction gearing of the type mentioned is the well-known planetary gearing. A planetary gearing generally comprises a plurality of planet gears that mesh with both the outer ring gear as well as with an inner sun gear of the planetary gearing. The planet gears are generally rotatably mounted in a planet carrier. The planet carrier itself is aligned coaxially to the ring gear and the sun gear and likewise rotatably mounted. A planetary gearing basically offers the possibility to hold either the ring gear or the planet carrier or even the sun gear, where the other two components form the drive and the output of the gearing. It is common to use the ring gear as the fixed system and to connect the sun gear with the drive shaft. The planet carrier in this case forms the output of the planetary gearing.

High reduction ratios can already be realized with a conventional planetary gearing, in particular when the planetary gearing comprises several stages. If the planetary gearing is embodied in a multi-stage manner, however, more installation space is required in the axial direction. Some applications, however, require highly reduced gearings which may in the radial direction require somewhat more installation space, but must in the axial direction be extremely short. There are already several gearing types known that are used in such cases which are generally designed having a single stage. These gearing types include, for example, the ellipto-centric gearing, known as "Harmonic drive". Such a gearing is known from DE 10 2008 061672 A1. Such a Harmonic drive is composed of three components, namely an elliptical drive disk, the so-called wave generator, an elastic transmission sleeve with external gear teeth, the so-called flex spline, and a rigid cylindrical outer ring with internal gear teeth, the so-called circular spline. All three components are arranged concentrically to one another. The elastic transmission sleeve always adapts itself to the external contour of the elliptical drive disk. Rotation of the drive disk therefore effects a continuous deformation of the elastic transmission sleeve. The elliptical shape causes the external gear teeth of the elastic transmission sleeve to be in engagement with the internal gear teeth of the rigid cylindrical outer ring only at two opposite sections. By rotating the elliptical drive disk, a circumferential displacement of the engagement occurs between the internal gear teeth of the elastic transmission sleeve and the outer gear teeth of the rigid cylindrical outer ring. The reduction is obtained in that the external gear teeth of the elastic transmission sleeve are fewer teeth than the internal gear teeth of the outer ring. Strain wave gearings are known to be robust and reliable. However, the elastic transmission sleeve requires the use of special wear-resistant materials, which makes the production of such gearings relatively expensive. In addition, the permanent deformation of the elastic transmission sleeve leads to lossy transmission.

Another gearing type with a high reduction ratio is the cycloidal drive, also known as an "eccentric drive". Such a gearing is known, for example, from DE 10 2004 048197 A1. In this type of gearing, an eccentric drives a cam disc having a certain number of cam sections on the outer perimeter. The cam disk rolls around a stationary pin ring. The number of pins exceeds the number of cam sections by exactly one pin. With every rotation of the drive gear, the output moves on by one cam section. Cycloidal drives as well are extremely robust and durable. Due to the wobbling motion of the cam disk, however, vibrations can sometimes occur that can have a particularly negative impact on the degree of efficiency of the gearing. Cycloidal drives are also relatively expensive to manufacture.

A Wolfrom gearing is to be mentioned as a further gearing type with a high reduction ratio. This gearing type is a special form of a conventional planetary gearing. A Wolfrom gearing is known, for example, from DE 10 2010 0128 79 A1.

All of the aforementioned types of gearings have the disadvantage that no optimum degree of efficiency can be achieved, in particular with very high reduction ratios. In addition, the aforementioned reduction gearings are also relatively expensive to manufacture.

SUMMARY

The object of the present invention is to provide a reduction gearing which allows very large reductions with a single-stage design and has a higher degree of efficiency than reduction gearings known from prior art at a comparable overall installed size. The reduction gearing is further to be simply and inexpensively manufactured.

The object is satisfied by the features of independent claim 1. According thereto, the object of the invention is satisfied according to the invention for a reduction gearing, when the planet gear comprises a guide member that is spaced apart from the planet gear axis and describes a hypocycloid relative to the ring gear when the planet gear rolls around, wherein guidance is provided between the guide member and a cam disk of the output such that the output experiences a drive motion by the planet gear rolling around.

The reduction gearing according to the invention allows for very large ratios of up to 6000:1, even with a single-stage design. Higher degrees of efficiency can thereby be achieved than with the known high step-down reduction gearings. The reduction gearing according to the invention also has the advantage that it is designed extremely short and is constructed in a particularly simple manner. It can be produced very simply and inexpensively.

The invention is further illustrated in more detail by the following advantageous embodiments. They are the subject matter of the dependent claims.

In a particularly preferred embodiment of the present invention, the cam contour of the cam disk is a closed hypocycloid or the envelope of a closed hypocycloid, which is described by the motion of the guide member at a ratio other than the actual ratio of the effective radius of the ring gear to the effective radius of the planet gear. Preferably, the hypocycloid of the cam disk differs only slightly from the hypocycloid describing the path of the guide member. This causes the cam disk, and with it the output of the gearing, to rotate further only very slowly. The guide member is in comparison to the other dimensions of the gearing components preferably embodied nearly point-shaped. However, it is pointed out that the cam contour of the cam disk can never be an exact hypocycloid due to the necessary finite extension of the guide member. Instead, it is a cam contour or the envelope of a cam contour running at a certain distance from the exact hypocycloidal path. However, if the guide member, for example, is a cylindrical pin, then this distance is constant and equals to the radius of the pin. It can be provided, that this cam contour is overlaid with a periodically recurring deviation. With the reduction gearing according to the invention non-uniform output speeds can thereby also be achieved with uniform drive speeds. With a respective design of the cam disk, any desired periodically recurring time-rotational-speed functions can therewith be mapped.

In a further particularly preferred embodiment of the present invention, the guide member is disposed between the planet gear axis and the pitch circle of the planet gear. In this embodiment, the path described by the guide member when the planet gear rolls around corresponds to a shortened hypocycloid, also referred to as a "hypotrochoid." The reduction gearing according to the invention is in this embodiment designed in a very compact manner. Furthermore, the shape of the cam disk in this embodiment ensures a uniform drive motion of the output. It is pointed out that the guide member can theoretically be arranged at a distance from the planet gear axis that is larger than the effective radius of the planet gear. In this case, the guide member describes an extended hypocycloid. This embodiment is suited, for example, if a non-uniform rotational motion of the output or even alternating forward and reverse motions are desirable.

In a further particularly preferred embodiment of the present invention, the guide member is a pin which is aligned parallel to the planet gear axis and is guided along the cam contour of the cam disk. This ensures a simple design of the reduction gearing according to the invention as well as simple and cost-effective production. It is particularly advantageous if the pin is rotatably mounted on the planet gear and rolls around along the cam contour of the cam disk. This embodiment entails very low friction losses. The degree of efficiency of the reduction gearing according to the invention is therefore very high. Preferably, the pin is rotatably mounted at the planet gear using a roller bearing. Highly preferred for this purpose is a needle bearing. The pin can alternatively also be fixedly attached to the planet gear. In this case, it is advantageous if a sleeve rolling around along the cam contour of the cam disk is rotatably mounted on the pin. If the pin is itself rotatably mounted at the planet gear, then it can be advantageously made of ceramic. As a result, both the wear and the friction losses are reduced. The reduction gearing is therefore very durable, reliable and at the same time efficient. It is of particular advantage if the pin is manufactured from zirconium oxide. Alternatively the pin can advantageously also be manufactured from hard metal.

In a further particularly preferred embodiment of the present invention, the reduction gearing comprises exactly three planet gears. The planet gears are preferably distributed evenly over the perimeter of the gearing or the perimeter of the ring gear, respectively. This results in a particularly quiet run of the reduction gearing according to the invention. It should be pointed out that basically more planet gears can be provided.

The guide between the guide member and the cam contour can be improved if each planet gear comprises two guide members that are arranged at the same distance from the planet gear axis, offset from each other by 180° relative to the planet gear axis. It is quite possible that not always both guide members of a planet gear are simultaneously in engagement with the cam disk. However, at least one of the two guide members is always in contact with the cam contour of the cam disk. The embodiment with two oppositely disposed guide members is suitable in particular when the cam disk has a central recess being defined by the cam contour. Particularly preferably, the cam contour is the envelope of a closed hypotrochoid overlaid by itself.

In a further particularly preferred embodiment of the present invention, the cam contour of the cam disk defines a central recess of the cam disk. The cam disk can thereby be manufactured in a very simple and inexpensive manner. Alternatively, the cam contour can be formed, for example, by a groove in the cam disk.

The drive of the reduction gearing according to the invention can be implemented in several ways. In a particularly preferred embodiment of the present invention, the reduction gearing comprises a sun gear meshing with the planet gear and serving to drive the planet gear. The planet gear or the planet gears, respectively, is or are supported floatingly between the sun gear and the ring gear. A planet carrier can of course additionally be provided. In this embodiment, a planetary stage is quasi realized within the reduction gearing of the invention by engagement of the sun gear with the planet gears. A very high reduction ratio can be achieved with his additional planetary stage. Alternatively, driving the planet gear can be effected via a planet carrier being rotatably supported coaxially to the ring gear. In this solution, the additional reduction via the planetary stage is omitted. The degree of efficiency of the reduction gearing, however, is particularly high in this embodiment. It is noted only additionally, that the ring gear can in theory also serve as a drive. The planet gear can also be driven directly.

The reduction gearing according to the invention already with a single-stage design having no additional planetary stage allows very high reduction ratios ranging between 5:1 and 500:1. The reduction gearing according to the invention can of course also be implemented having several stages.

The invention is further illustrated in more detail using the drawings.

DETAILED DESCRIPTION OF SPECIFIC EMBODIMENTS

Figure 1:
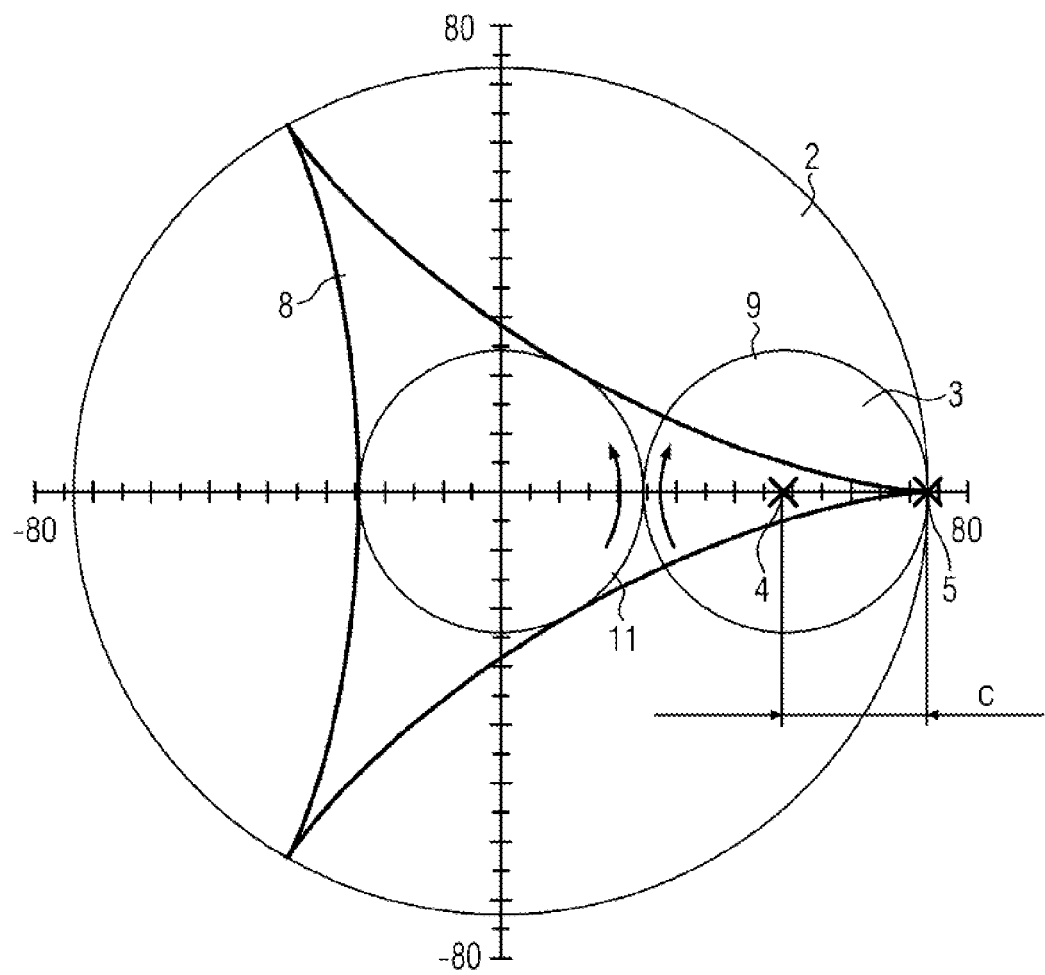
FIG. 1 shows an arrangement comprising a ring gear, a sun gear and a planet gear for creating a hypocycloid.

It applies to the following embodiments that like parts are designated by like reference numerals. If a drawing contains reference numerals which are not explained in the accompanying figure description, then reference is made to preceding or subsequent figure descriptions.

FIG. 1 shows an arrangement comprising a ring gear 2, a sun gear 11 and a planet gear 3. The ring gear 2 forms the fixed system, the sun gear 11 is arranged concentrically to the ring gear 2 and rotatably mounted relative to the ring gear. The common axis is located at the origin of the coordinate system shown. The planet gear 3 meshes both with the sun gear as well as with the ring gear. Commonly, all three gears comprise gear teeth which are not shown in the drawing. The pitch circle 9 of the planet gear 3 touches the pitch circle of the ring gear and the pitch circle of the sun gear. The axis of the planet gear 3 is denoted by reference numeral 4. When the sun gear 11 is driven, the planet gear 3 rolls around on the inner perimeter of the ring gear 2. Point 5 on the pitch circle 9 of the planet gear 3, which in the starting position touches the pitch circle of the ring gear, there describes the closed hypocycloid 8. The parametric representation of this hypocycloid 8 can be described by the following two formulas:

$$x(\alpha) = (R-r)\cdot\cos\left(\frac{r}{R}\alpha\right) + r\cdot\cos\left(\left(1-\frac{r}{R}\right)\cdot\alpha\right)$$
$$y(\alpha) = (R-r)\cdot\sin\left(\frac{r}{R}\alpha\right) - r\cdot\sin\left(\left(1-\frac{r}{R}\right)\cdot\alpha\right)$$

where:
R=radius of the fixed ring gear 2
r=radius of the planet gear 3
α=angle of rotation.

When the ratio R/r=m is an integer, then the hypocycloid is composed of m contiguous arcs. When the ratio is not an integer, then the arcs overlay. When the ratio is rational, then the curve is closed after a certain number of revolutions. With a planetary gearing, the ratio of the radii can be replaced by the number of teeth of the gears. In this case, the ratio R/r is always rational. In the case shown in FIG. 1, the ratio is m=R/r=72/24.

Figure 2:
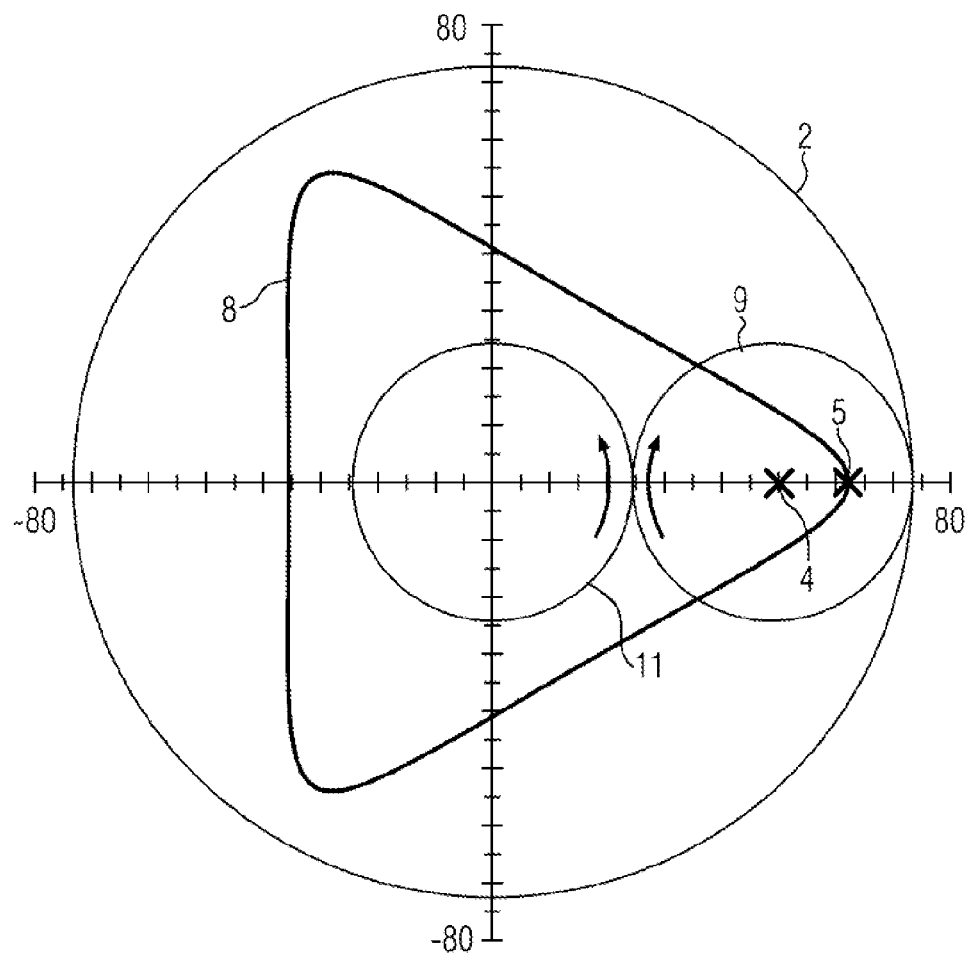
FIG. 2 shows the arrangement of FIG. 1 in a slightly modified form for creating a shortened hypocycloid.

When the point whose path is examined is not on the pitch circle 9 of the planet gear, but inside or outside, then a shortened or lengthened hypocycloid is created, respectively. Shortened and lengthened hypocycloids are also referred to as "hypotrochoids". The arrangement in FIG. 2 corresponds to the arrangement from FIG. 1. FIG. 2, however, shows the path of a point 5 which is located within the pitch circle 9 of the planet gear 3. In the case illustrated, the distance of the point 5 from the planet gear axis 4 is 13 units. Accordingly, this point describes a shortened hypocycloid 8. The parametric representation of the hypocycloid is:

$$x(\alpha) = (R-r)\cdot\cos\left(\frac{r}{R}\alpha\right) + c\cdot\cos\left(\left(1-\frac{r}{R}\right)\cdot\alpha\right)$$
$$y(\alpha) = (R-r)\cdot\sin\left(\frac{r}{R}\alpha\right) - c\cdot\sin\left(\left(1-\frac{r}{R}\right)\cdot\alpha\right)$$

where:
c=distance of point 5 from the planet gear axis 4 (shown in FIG. 1).

Figure 3:
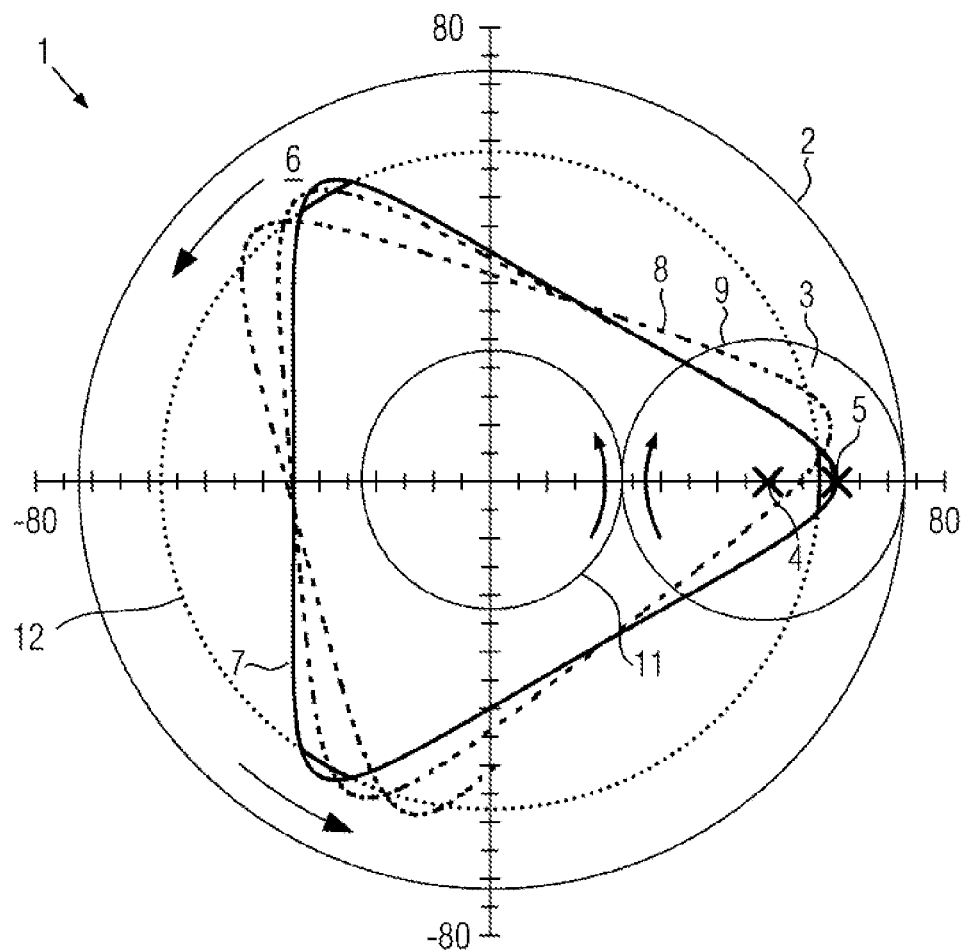
FIG. 3 shows a first embodiment of a reduction gearing according to the invention.

FIG. 3 shows a first embodiment of a reduction gearing 1 according to the invention. The reduction gearing comprises an arrangement as shown in FIGS. 1 and 2. The reduction gearing additionally comprises a cam disk 6. The cam disk 6 comprises a cam contour 7 corresponding to the path 8 found in FIG. 2. Due to the integer ratio m=R/r=72/24=3/1, this is a closed shortened hypotrochoid with three arcs. The basic arrangement of the ring gear 2, the sun gear 11, and the planet gear 3, as already mentioned above, corresponds to the arrangement of FIGS. 1 and 2. However, a different ratio m=R/r was selected. In the case shown, the ratio is m=R/r 73/25. The number of teeth of the ring gear and the planet gear was therefore each increased by one tooth. This leads to point 5 on the planet gear 3 no longer describing the closed shortened hypocycloid shown in FIG. 2 with three arcs, but the shortened hypocycloid 8 overlaid by itself. According to the invention, there is guidance between point 5 on the planet gear and the cam contour 7 of the cam disk 6. Since the cam disk 6 is rotatably mounted concentric to the ring gear and the sun gear, this guidance sets the cam disk 6 into rotation. The reduction ratio between the planet carrier 12 (shown in FIG. 3) as the drive and the cam disk 6 as the output of the gearing is calculated via the ratio $m_7/m_8$, where:
$m_7$=72/24 and
$m_8$=73/25.

If the planet carrier is not driven directly but, as in the case shown, via a sun gear, then an even greater reduction results.

Figure 4:
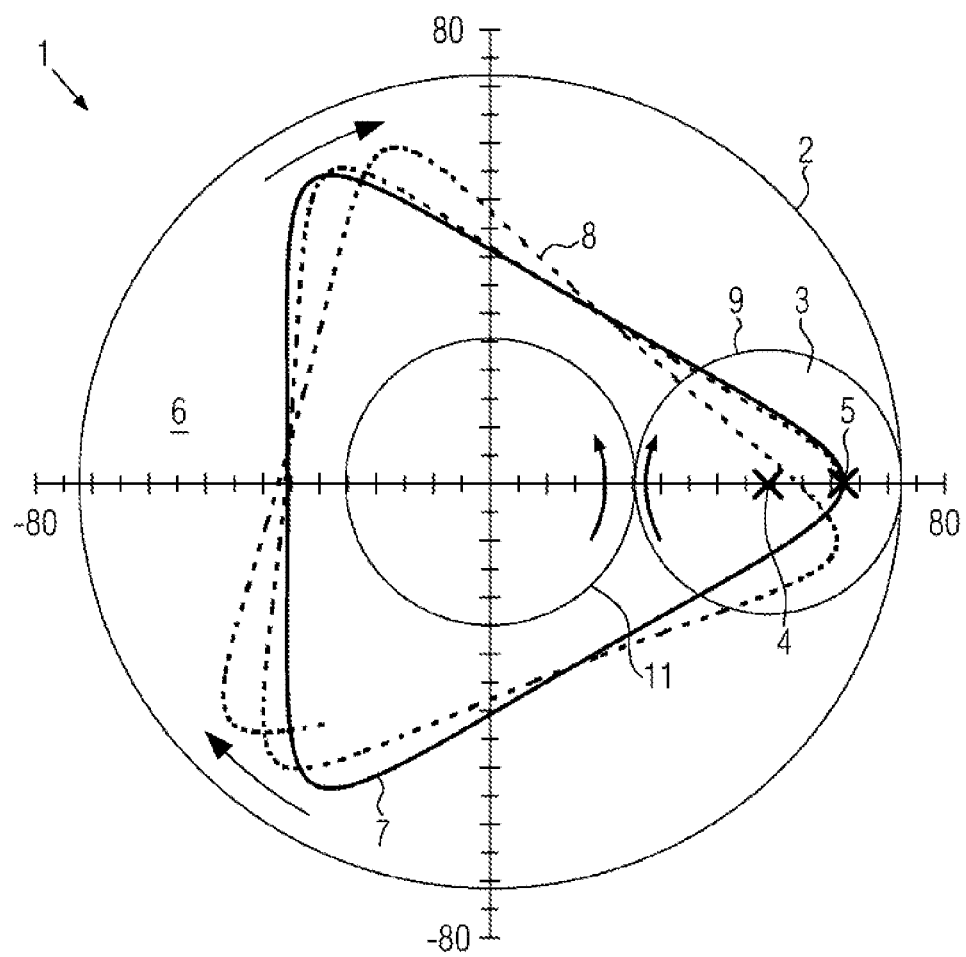
FIG. 4 shows a modification of the reduction gearing according to the invention from FIG. 3.

FIG. 4 shows the scheme of a similar reduction gearing. Here, a ratio $m_8$=71/23 was chosen. The ratio $m_7$, via which the cam contour 7 of the cam disk was created, is unchanged at 72/24. While the sun gear 11 and the cam disk 6 in the reduction gearing of FIG. 3 have the same direction of rotation, there is a reversal of direction in the reduction gearing of FIG. 4.

Figure 5:
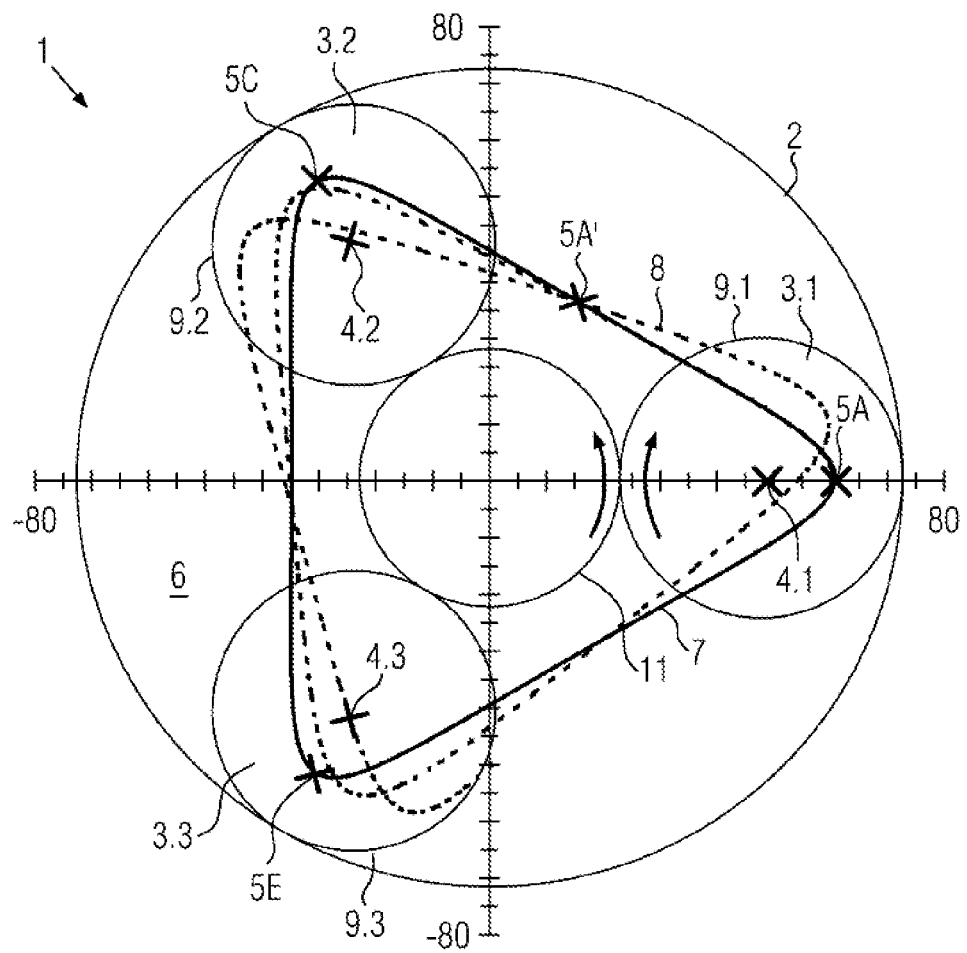
FIG. 5 shows a further modification of the reduction gearing according to the invention from FIG. 3.

FIG. 5 shows the reduction gearing of FIG. 3 with two additional planet gears 3.2 and 3.3. The three planet gears 3.1, 3.2 and 3.3 are arranged in a manner distributed uniformly over the perimeter of the reduction gearing. Each planet gear comprises a point-shaped guide member 5A, 5C, and 5E, respectively. With this reduction gearing, there is guidance between the cam contour 7 of the cam disk 6 and each of the three point-shaped guide members 5A, 5C, 5E. Compared with the reduction gearing of FIG. 3, this embodiment ensures a smoother run. The cam disk 6 can be designed, for example, such that the cam contour 7 defines a central recess of the cam disk. In this case, pins rotatably mounted on the planet gears can be used pins as guide members which roll around along the cam contour 7 of the cam disk 6. The reduction gearing of FIG. 5 has the problem, however, that the motion of the three pins does not in every position result in advancement of the cam disk 6. If, for example, one examines the path of point 5A on the first planet gear 3.1 starting from the initial state, then this point generates advancement of the cam disk 6 until it reaches position 5A'. From this position, point 5A moves away from the cam contour 7 of the cam disk 6. In order to counteract this problem, it would be theoretically possible to use a second cam disk, for example, on the opposite side of the planet gears, which is offset relative to the first cam disk by 180° and is in engagement with additional respective pins on the opposite side of the planet gears. The two cam disks being offset relative to each other must be connected to each other. Since this solution is not technically feasible without encapsulating the ring gear within the output formed by the two cams disks, the only solution for the reduction gearing from FIG. 5 remains to embody the cam contour 7 as a groove.

Figure 6:
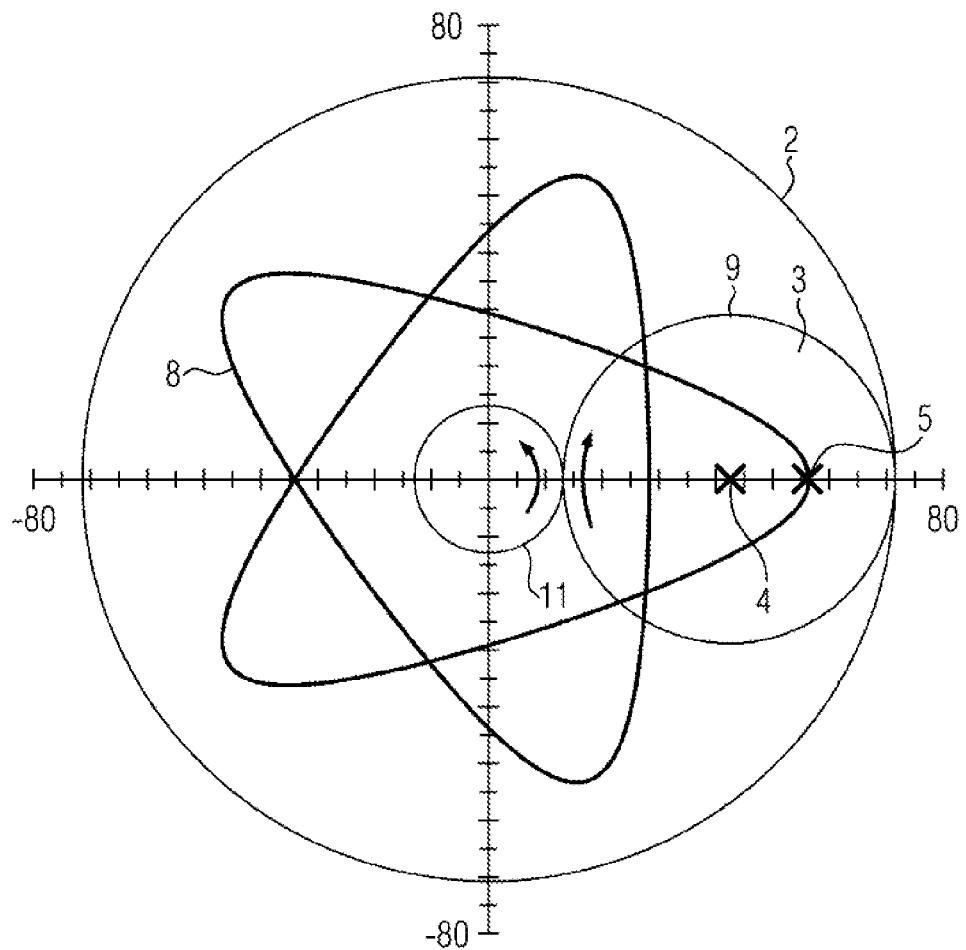
FIG. 6 shows an arrangement comprising a ring gear, a sun gear and a planet gear for creating a closed shortened hypocycloid overlaid by itself.
Figure 7:
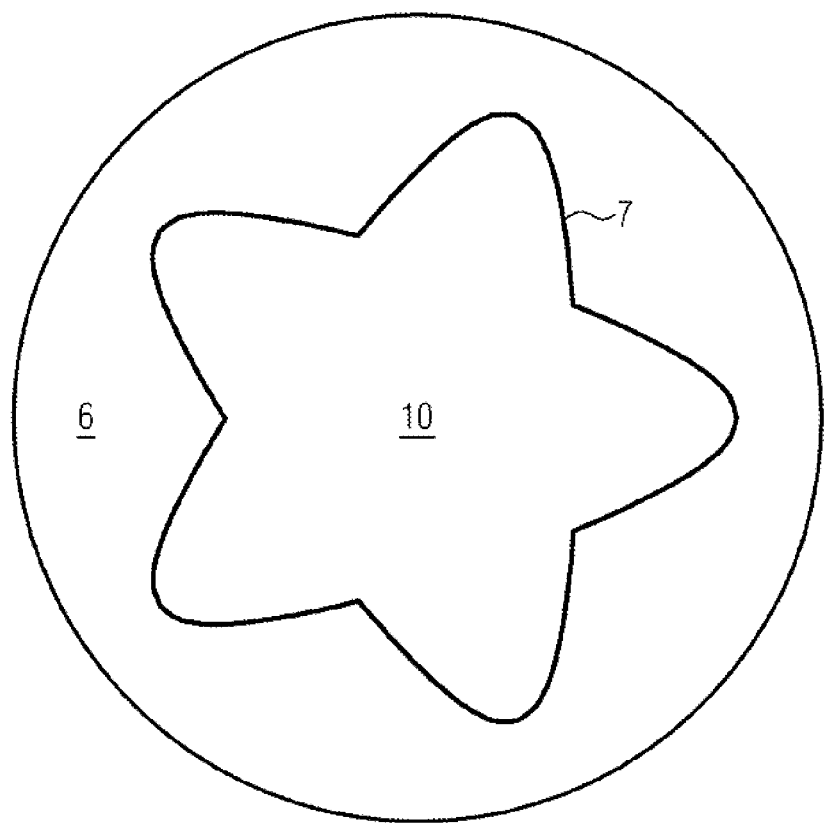
FIG. 7 shows the cam disk of a reduction gearing of the invention according to a further embodiment.
Figure 8:
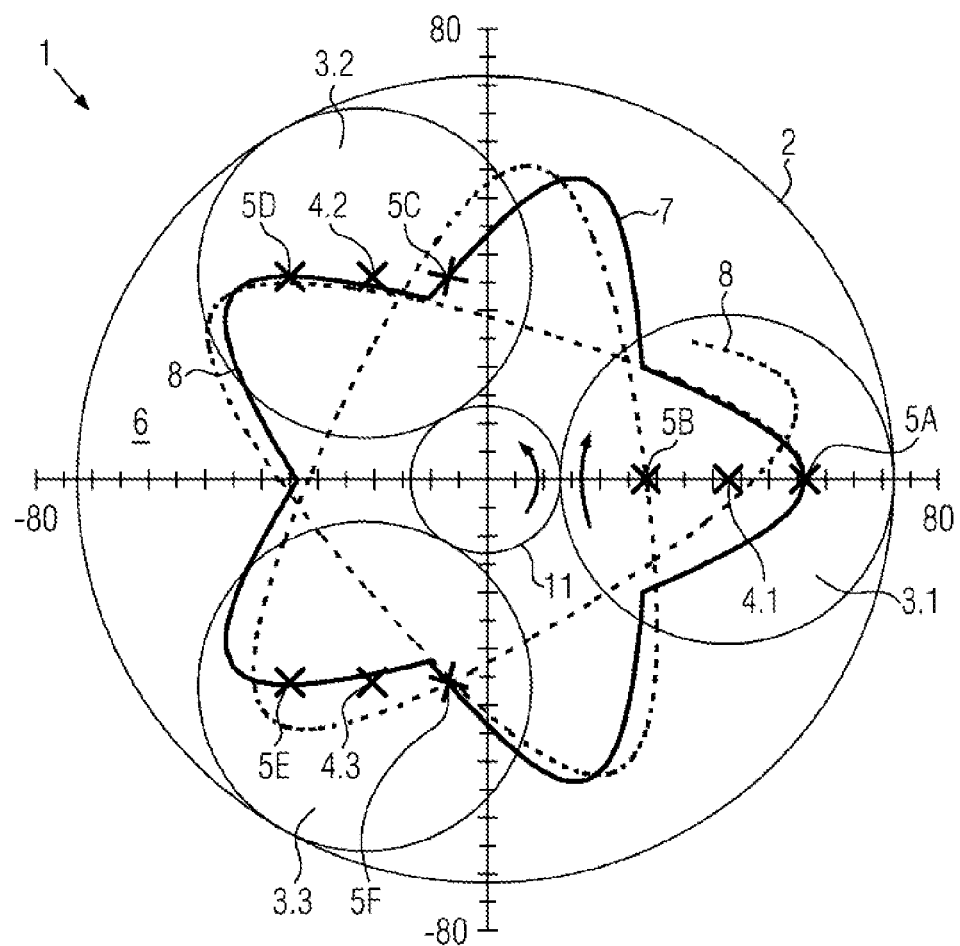
FIG. 8 shows a reduction gearing according to the invention with the cam disk from FIG. 7.
Figure 9:
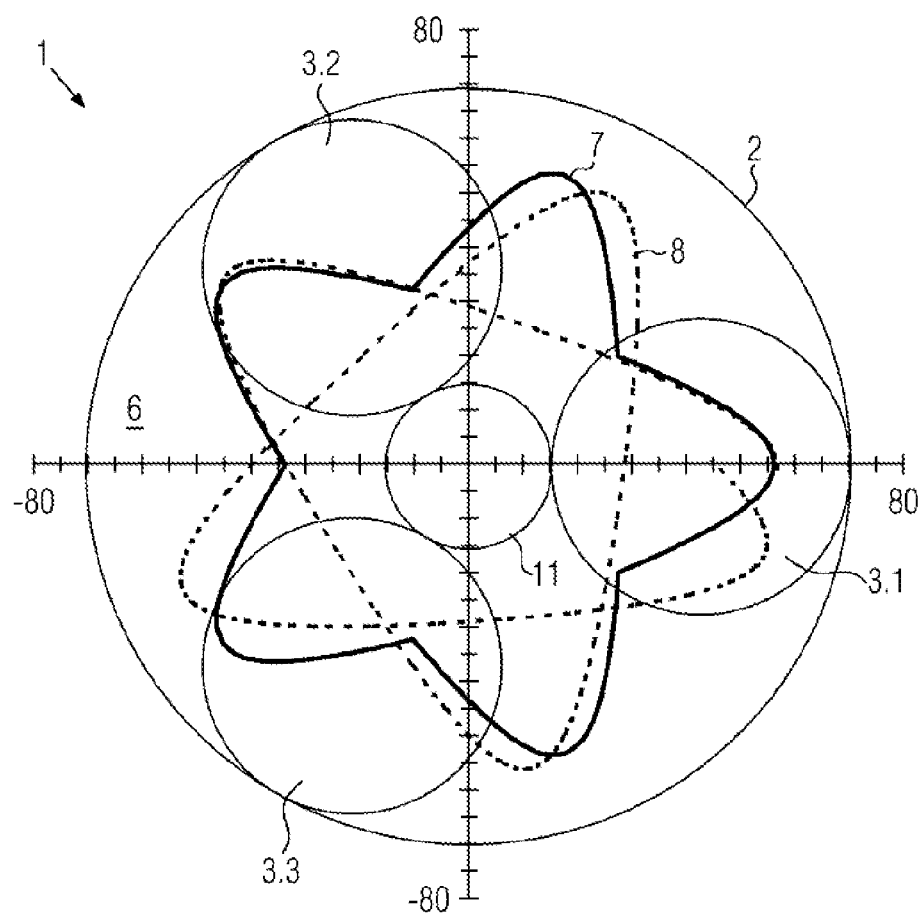
FIG. 9 shows the reduction gearing according to the invention from FIG. 8 in a modified form.
Figure 10:
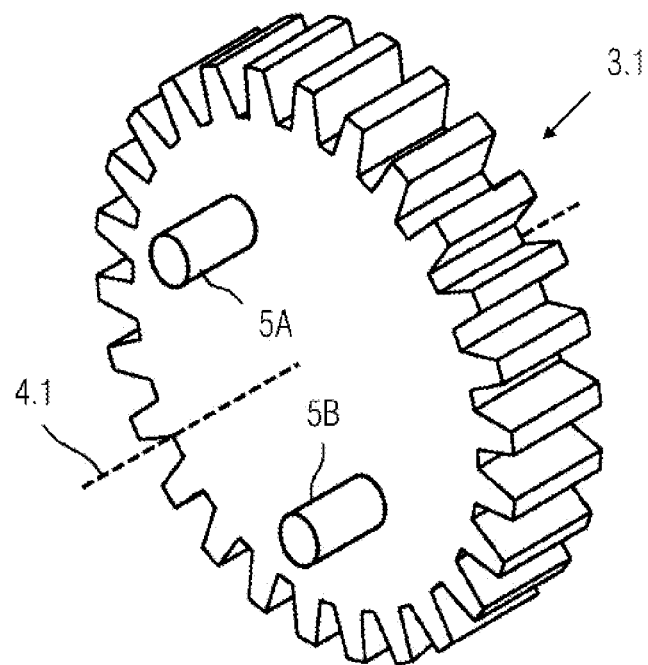
FIG. 10 shows one of the planet gears from FIGS. 8 and 9, showing guiding pins thereon.

FIG. 6 shows an arrangement similar to the arrangement of the FIGS. 1 and 2 for creating a closed shortened hypocycloid 8 overlaid by itself. The ratio m=R/r in this case is 70/28. FIG. 7 shows a cam disk 6, the cam contour 7 of which is formed by the envelope of the hypocycloid 8 shown in FIG. 6. For the cam disk 6 shown in FIG. 7, the cam contour 7 defines a central recess 10 of the cam disk. The cam disk is used in the reduction gearing 1 shown in FIG. 8. The number of teeth of the ring gear and the planet gear is in this reduction gearing each increased by one tooth with respect to the apparatus from FIG. 6. The ratio $m=R/r$ is therefore 71/29. Similar to the reduction gearing of FIG. 5, the reduction gearing of FIG. 8 also comprises three planet gears that are arranged in a manner distributed uniformly over the perimeter of the reduction gearing. Two pins are rotatably mounted at each planet gear. The two pins are each arranged at the same distance from the planet gear axis and offset from each other relative to the planet gear axis by 180°. The two pins are therefore arranged opposite to each other. The first planet gear 3.1 comprises two pivot pins 5A and 5B (also shown in FIG. 10), the second planet gear 3.2 two pins 5C and 5D, and the third planet gear 3.3 two pins 5E and 5F. The hypocycloid 8 describes the path of the first pin 5A on the first planet gear 3.1. It is clearly visible that pin 5A does not roll around continuously along the cam contour 7 of the cam disk 6. However, there is at all times an entraining engagement of at least one of the pins 5A to 5F with the cam contour 7 of the cam disk 6, so that the cam disc 6 is continuously rotated. The axes of rotation of pins 5A to 5F are parallel to the respective planet gear axis. Pins 5A to 5F are preferably made of ceramic and are rotatably mounted in the respective planet gear using a rolling bearing, in particular using a needle bearing. In the reduction gearing of FIG. 8, the sun gear 11 and the cam disk 6 have the same direction of rotation. The reduction gearing of FIG. 9, however, causes a reversal of the direction of rotation. This gearing has the same cam disk as the gearing from FIG. 8. The ratio $m=R/r$ is 69/27 instead of 71/29.

The invention claimed is:

1. Reduction gearing with:
   a ring gear,
   at least one planet gear rolling around in said ring gear with a planet gear axis, and
   an output rotatably mounted coaxially to said ring gear,
   wherein said planet gear comprises a guide member that is spaced apart from said planet gear axis and moves along a first hypocycloid relative to said ring gear when said planet gear rolls around in said ring gear,
   wherein said guide member is guided by a cam disk of said output such that said output experiences a rotary drive motion imparted by said cam disk guiding said guide member when said planet gear rolls around in said ring gear,
   wherein said cam disk comprises a cam contour for guiding said guide member,
   wherein said cam contour is either a closed second hypocycloid obtained by the motion of said guide member at a ratio other than an actual ratio of an effective radius R of said ring gear to an effective radius r of said planet gear, or an envelope of said closed second hypocycloid.

2. The reduction gearing according to claim 1, wherein said cam contour of said cam disk deviates periodically from said closed second hypocycloid or from said envelope of said closed second hypocycloid.

3. The reduction gearing according to claim 1, wherein said guide member is arranged between said planet gear axis and a pitch circle of said planet gear.

4. The reduction gearing according to claim 1, wherein said guide member is a pin that is aligned parallel to said planet gear axis and is guided along said cam contour of said cam disk.

5. The reduction gearing according to claim 4, wherein said pin is rotatably mounted at said planet gear and rolls around along said cam contour of said cam disk.

6. The reduction gearing according to claim 5, wherein said pin is manufactured from ceramic or hard metal.

7. The reduction gearing according to claim 6, wherein said pin is manufactured from zirconium oxide.

8. The reduction gearing according to claim 1, wherein said at least one planet gear is exactly three planet gears.

9. The reduction gearing according to claim 1, wherein each planet gear respectively comprises two guide members that are arranged at the same distance c from said planet gear axis offset from each other by 180° relative to said planet gear axis.

10. The reduction gearing according to claim 1, wherein said cam contour of said cam disk defines a central recess of said cam disk.

11. The reduction gearing according to claim 1, wherein said cam contour is formed by a groove in said cam disk.

12. The reduction gearing according to claim 1, wherein said reduction gearing further comprises a sun gear meshing with said planet gear and serving to drive said planet gear, wherein said planet gear is supported floatingly between said sun gear and said ring gear.

13. The reduction gearing according to claim 1, wherein said planet gear is drivingly effected via a planet carrier being rotatably supported coaxially to said ring gear.

14. The reduction gearing according to claim 1, wherein a reduction ratio of said reduction gearing is in the range between 5:1 and 500:1.

\* \* \* \* \*